Figures 1, 1A:
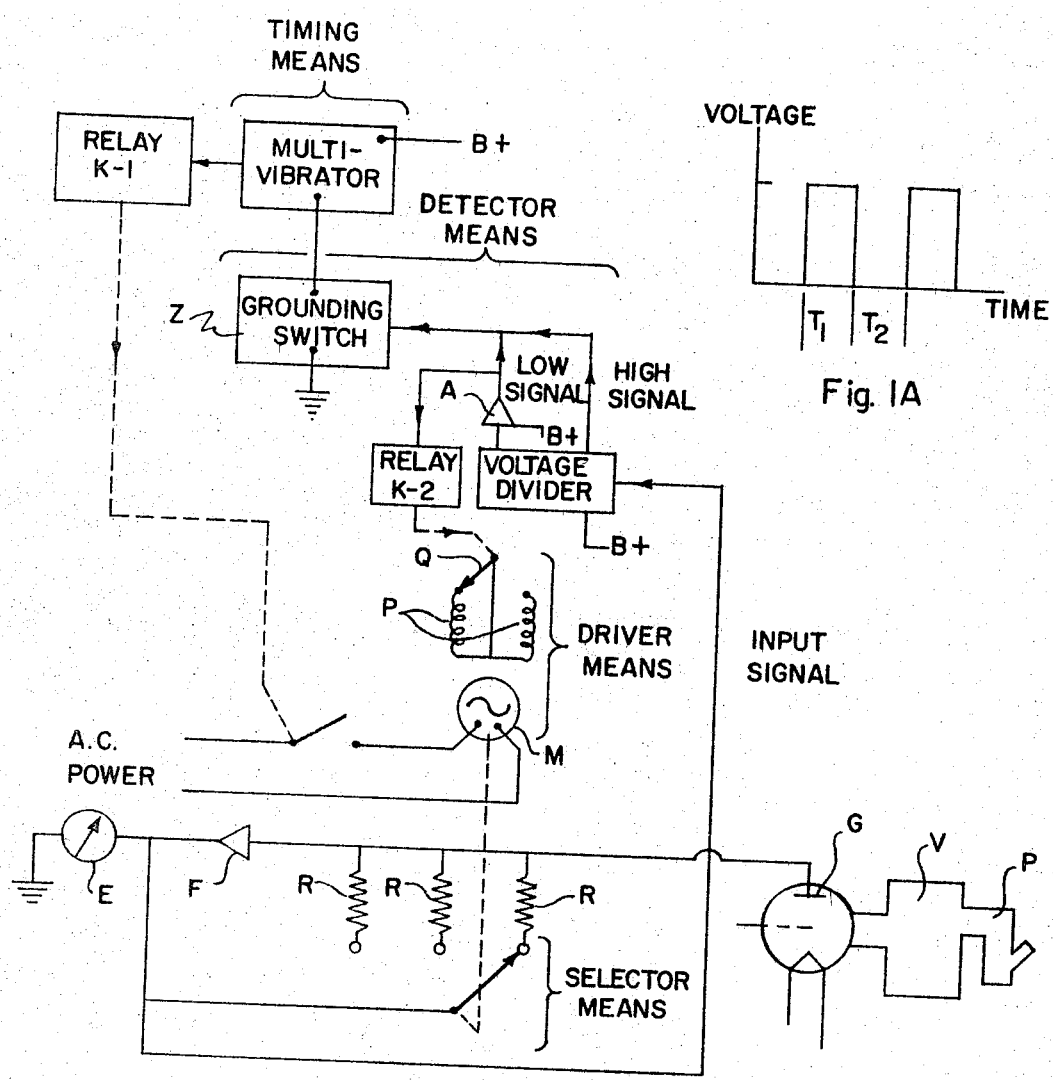

RANGE LIMIT SWITCH

United States Patent Office 3,317,834
Patented May 2, 1967

3,317,834
AUTOMATIC RANGE SWITCHING CONTROL FOR CONTINUOUSLY MONITORING AN ELECTRICAL SIGNAL INPUT
Paul L. Vitkus, Bedford, Mass., assignor to National Research Corporation, Cambridge, Mass., a corporation of Massachusetts
Filed July 10, 1963, Ser. No. 294,045
10 Claims. (Cl. 324—115)

This invention relates to automatic range selectors, and more particularly, to means for automatically measuring and controlling the operation of a vacuum system with a high degree of precision.

A vacuum system comprises an hermetically sealed chamber, a pumping system to evacuate the chamber and a vacuum gauge for measuring the residual pressure in the chamber. The gauge produces an electrical signal which varies as a function of the pressure and can be amplified and read by a conventional meter.

The vacuum systems of primary concern in the present invention are operated in the range from $10^{-4}$ torr (mm. Hg abs.) down to $10^{-11}$ torr and below. Operation over such a wide range could be followed on a single logarithmic scale. However, this would be less precise and less sensitive than the use of different ranges and corresponding meter resistances, for each decade of pressure. When using a set of range defining resistances, it is important to have an automatically operating range switch which will select the appropriate range defining resistance quickly so that the meter (or other output device) will not be subject to off-scale signals for sustained periods.

It is a general object of the present invention to provide an automatic range selector, which will be especially suitable for vacuum gauges.

It is a further object to provide an automatic range switch which will have a long life, low materials cost, high reliability, small size and little susceptibility to jamming.

It is a further object to provide an automatic range switch having a switching speed which can follow the rapid pressure changes experienced in vacuum systems while pumping down, outgassing, and baking.

It is a further object to provide an automatic range switch which can be set back to manual operation. For instance, if the automatic switch is set to move to the next lower range at 7 percent of full scale and the operator wishes to anticipate this switch for purposes of a more accurate reading, or as a way of controlling an output signal device controlled by the meter switch, he can do so conveniently.

It is common in manual gauge controls to provide a protection circuit which will shut off the power supply to the gauge in case of an over-scale reading. Accordingly, it is a further object of the invention that the protective device may be shut off in the range of signals corresponding to gauge operation to avoid premature cut-off, yet the range switch will automatically reinstate the protection device when the gauge is exposed to pressures above the normal operating range of the range switch.

It is a further object to provide an automatic range switch that will automatically cycle to zero for ease of zero setting.

It is a further object to provide an automatic range switch which is flexible in the choice of inputs and outputs to be associated with it, making it of general utility in installations requiring automatic control of a process, or where remote or unattended operation is necessary.

These and other objects of the invention will in part be obvious and will in part appear hereinafter.

The objects of the invention are accomplished by a new structural combination, a unijunction multivibrator, high speed switching transistors and a reversible, shaded pole motor.

The invention accordingly comprises a vacuum-gauge-automatic-range-switch, having subcombinations of general utility for switching devices, the scope of application of which is indicated in the claims.

Figure 2:
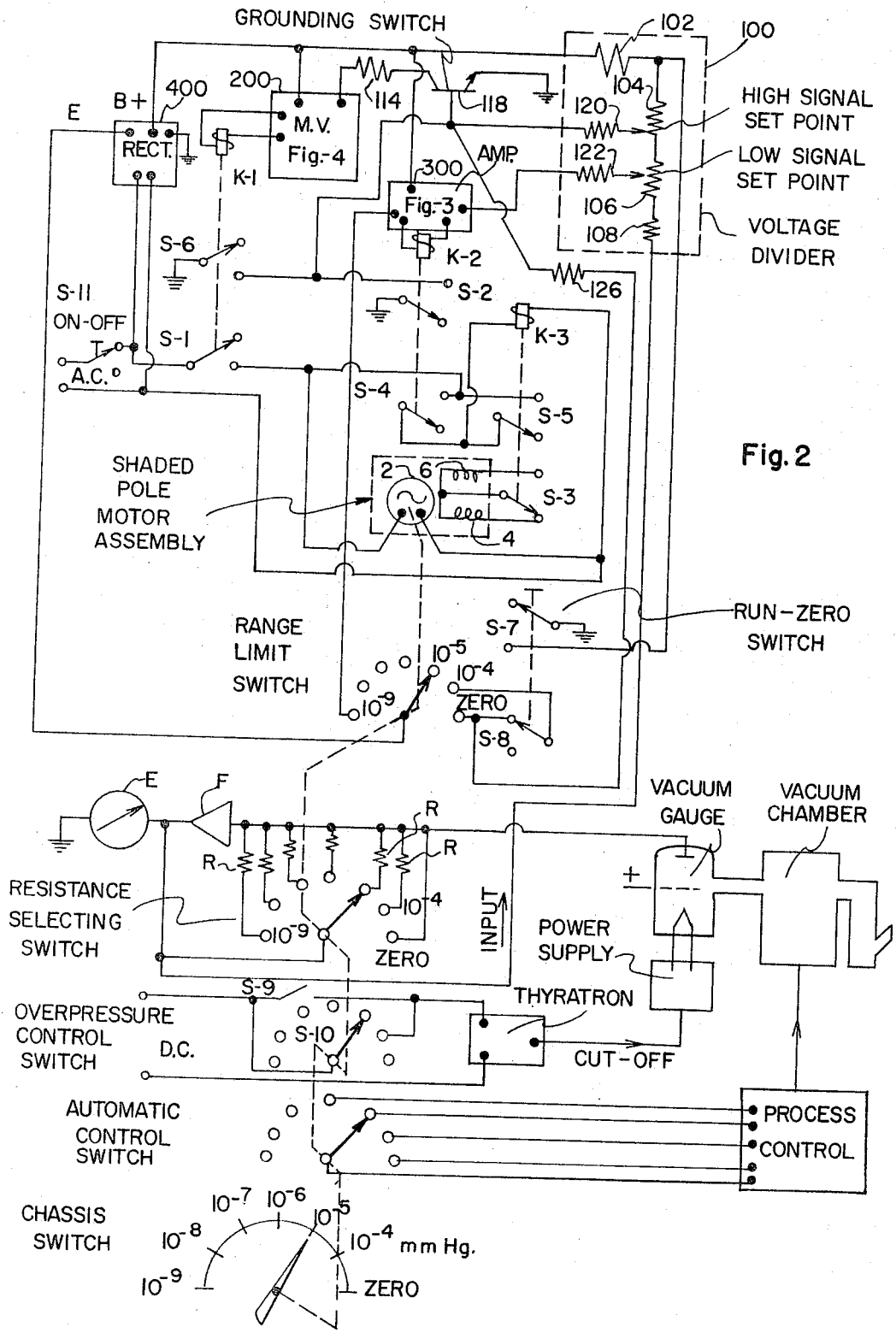
Figure 4:
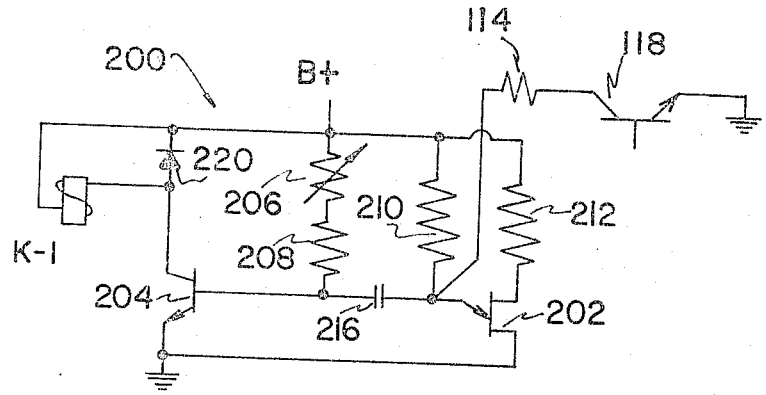
Figure 3:
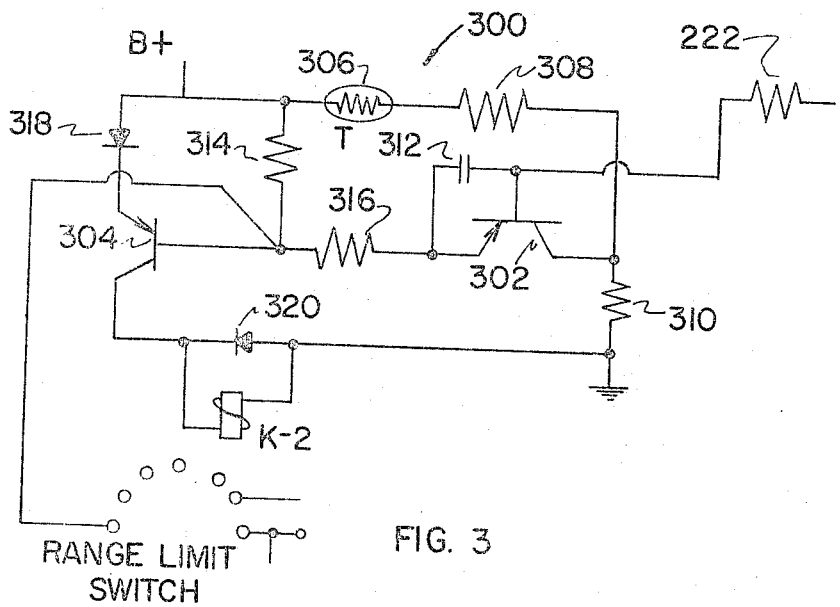

The nature and objects of the invention are more fully described with reference to the detailed description below, of a preferred embodiment taken in connection with the accompanying drawings wherein:

FIG. 1 is a simplified block diagram of the invention,
FIG. 1A is a graph showing multivibrator operation,
FIG. 2 is a schematic, wiring diagram of the invention, and
FIGS. 3 and 4 are wiring diagrams of sub-assemblies of the unit shown in FIG. 2.

The range switch control circuit of the invention is outlined in block diagram form in FIG. 1. The vacuum system comprises a vacuum chamber V which may be used for metallizing, space simulation experiments, metal refining, and the like. The chamber is evacuated by a pumping system P and the residual pressure therein is measured by gauge G. The gauge is connected to a set of range defining resistances R which are, in turn, connected to an electrometer E via selector means, such as a mechanical range selecting switch. A cathode follower feed back amplifier F is connected between the gauge and the eelctrometer in parallel with the resistances R.

The resistances R are of different values, each corresponding to a different decade (power of ten of mm. Hg) of pressure. The range selecting switch is automatically operated by the range switch control of the invention in the manner described below.

In accord with the invention, a timing means is used to set up a uniform rate of operation. The timing means comprises a multivibrator circuit in the preferred embodiment. The multivibrator sets up a square wave output, as shown in FIG. 1A, wherein the pulse time $t_1$ is approximately equal to $t_2$, the time between pulses. The cycle time $t_1$ plus $t_2$ is between one-half and one second.

Referring again to FIG. 1, it is seen that this output pulse is applied to relay means K-1 which connects motor M to its power supply. Motor M then drives the range selecting switch. The motor and output pulses are timed so that each pulse will cause the range selecting switch to move to the next resistance R which defines the next pressure range increment.

The motor is of the shaded pole type and is reversible by changing the direction of pole shading of coils P by operation of switch Q.

The voltage signal which is applied to electrometer E is also applied to the range switch control circuit as an input signal. This input is fed to detector means which control operation of the multivibrator and direction of operation of motor M until the signal falls within the desired range. The detector means comprise a voltage divider and switch means Z for grounding the multivibrator whenever the input signal is within predetermined high or low limits. The multivibrator is inactive when grounded and is activated by opening the grounding switch. The high signal output terminal of the voltage divider is directly connected to switch means Z and the low signal output terminal of the voltage divider is indirectly connected to switch means Z via a second path including an amplifier-switch A.

The switch Q is normally set so that motor M will drive the selector means to a higher range setting. When the range setting is too low, a signal is applied, via relay K-2, to reverse switch Q and the direction of motor M. This drives the selector means to a lower range setting.

FIG. 2 of the drawing is a wiring diagram of a preferred embodiment of the range selector of the invention, particularly adapted for use with a vacuum system having an ionization gauge. Such a gauge creates an ion current proportional to the pressure in the vicinity of the gauge electrodes. A resistance-selection-switch selects an appropriate resistor R for connecting in series with the ion current collector of the gauge and an electrometer E. The electrometer is a 100 microamp meter movement with a range of zero to minus two volts full scale.

DRIVING

Referring now to FIG. 2, the range switch control comprises a motor 2, including a clutch and gearing (not shown), which drives the resistance-selection-switch whenever switch S–1 is closed. A unijunction multivibrator circuit 200 drives solenoid K–1. Solenoid K–1 thus closes switch S–1 at periodic intervals $t_1$ in pulses of period $t_2$, as indicated in FIG. 1A. The amplitude of the multivibrator output pulse is 20 volts. Motor 2 is selected as a 20 r.p.m. (at the output gear) motor so that each pulse causes the motor output shaft and its driven switches to rotate 30°, a standard range increment.

The pressure ranges are established by the resistances R at the terminals of the range-selection-switch. Only six pressure range increments are shown for illustrative purposes, but it will be recognized that many more ranges may be provided.

TIMING

The multivibrator circuit 200, shown in FIG. 4, comprises a unijunction transistor 202, a potentiometer 206 for adjusting its timing, resistances 208, 210 and 212, a capacitor 216, and an output transistor 204. The operation of the multivibrator is normally prevented by grounding the base of unijunction transistor 202 via resistance 114 and transistor switch 118. Whenever the input signal from the vacuum gauge is high or low (full scale or 7 percent of full scale, respectively), this condition is sensed by a detector comprising voltage divider circuit 100 which applies an appropriate signal to the base of transistor 118 to cut it off, thus allowing the multivibrator to operate.

INPUT SIGNAL SENSING

Referring back to FIG. 2, it is seen that a high signal is sensed directly via resistance 120. A low signal is sensed via resistance 122 and amplifier-switch 300 which drives solenoid K–2 to close switch S–2, thus grounding the base of switching transistor 118 which serves as the grounding switch. Either the low signal or the high signal will cut off transistor 118, thus activating the multivibrator and causing the pulsating operation of motor 2.

POLE REVERSING

The direction of operation of motor 2 is determined by its pole shading coils 4 and 6. The loop of coil 4 is normally closed by switch S–3 so that operation of the motor drives the resistance-selection-switch to seek a higher range. However, whenever solenoid K–2 is operated in response to a low signal, as described above, it also closes switch S–4 which operates solenoid K–3 to reverse switch S–3 and open the loop of coil 4, while closing the loop of coil 6. The motor then drives the resistance-selection-switch to a lower range.

VOLTAGE DIVIDER

The voltage divider comprises series resistances 102, 104, 106 and 108 which are selected so that most of the voltage drop between the highly positive B voltage and the slightly negative input voltage occurs across resistance 102. The junction of resistances 102 and 104 may be grounded, in the manner described below, to cause the circuit 100 to impose an artificial signal simulating full scale upon the base of transistor 118 to automatically cycle the resistance-selection-switch to zero.

LOW SIGNAL AMPLIFICATION

The amplifier 300, shown in FIG. 3, comprises a first stage transistor 302 and an output transistor 304, a thermistor voltage divider network consisting of resistances 306, 308 and 310 in the emitter circuit of transistor 302, feedback capacitor 312 in the output circuit of transistor 302 and resistances 314 and 316. The thermistor network stabilizes the low set point. The feedback capacitor assures positive turn-on of transistor 302 when a low signal is sensed.

The source of B voltage is a conventional half wave rectifier, Zener regulated, contained within the range switch control circuit and indicated at 400 in FIG. 2.

STABILIZING

Protection against accidental damage is provided by the following elements. Switch S–5, the second switch operated by relay K–3, acts as a lock by providing an alternate current path through the coil of relay K–3 to prevent switch S–3 from switching while the motor is turning. Diode 318 insures a reverse bias on transistor 304 when transistor 302 is non-conducting and diodes 220 and 320 absorb voltage transients from relays K–1 and K–2. A high positive voltage E from the rectifier is applied to the base of transistors 118 or 304 via the limit switch to prevent rotation of the range selection switch beyond its high or low positions. Switch S–6, the second switch operated by relay K–1, grounds the base of transistor 118 so that multivibrator operation cannot be disturbed while the motor is turning. Thus, S–6 comprises a lock for the multivibrator.

ZERO-CYCLING

Whenever it is desired to automatically cycle the switch to zero, the manual run-zero cycle switch pair S–7 and S–8 is closed. Switch S–8 opens the limit switch connection to the $10^{-4}$ position and switch S–7 grounds the junction of resistances 102 and 104. The effect of grounding the junction is to cause motor 2 to automatically cycle all its switches to higher ranges until the zero position is reached. There, the range limit switch applies a high positive voltage E to the base of transistor 118 via resistor 126. This assures that transistor 118 will operate to ground the multivibrator 200.

In addition to the above described resistance-selection-switch and limit switch, motor 2 also drives a chassis dial indicator and auxiliary wafers (only one of which is indicated in the drawing, "The Automatic Control Switch") which may be hooked up to the vacuum system for automatic process control. Motor 2 also drives overpressure control switch S–10.

The motor's clutch is engaged whenever power is supplied to the motor. The motor-driven switches may be manually handled via the chassis switch even when the range switch is on automatic operation. It is better practice to first turn the on-off switch S–11 to the off position before operating the chassis switch manually.

For overpressure control, the conventional thyratron overpressure control circuit is opened by opening switch S–9. But the overpressure relay cut off switch S–10 restores the thyratron to full operation when the upper limit of the automatic range switch is reached.

It will be appreciated from the foregoing that the meter may be connected to the gauge throughout the automatic range switch operation, except for brief interruptions while motor 2 is driving the resistance-selection-switch from one terminal to another. There is no danger to the meter from this continuous connection because of the fast stepping speed and the matching of the range switch operation to the unique requirements of vacuum process monitoring. The high set point can be lowered by adjustment of the tap on resistance 104 to anticipate full scale. Similarly the low set point can be raised by adjustment of the tap on resistance 106 to anticipate a pressure fall.

In the preferred embodiment of the invention, the circuit values are selected as follows:

Transistors:

| | |
|---|---|
| 202 | 2N1671 |
| 204 | 2N335 |
| 118 | 2N335 |
| 302 | 2N335 |
| 304 | 2N525 |

Capacitors:

| | |
|---|---|
| 216 | 20μf. |
| 312 | .1μf. |

Resistors:

| | |
|---|---|
| 206 | 100K |
| 208 | 10K |
| 210 | 22K |
| 212 | 1.5K |
| 114 | 15K |
| 120 | 10K |
| 122 | 10K |
| 126 | 15K |
| 102 | 22K |
| 204 | 1K |
| 106 | .5K |
| 108 | 1.5K |
| 306 [1] | 100K |
| 308 | 47K |
| 310 | 1K |
| 314 | 4.7K |
| 316 | 47K |

A range switch constructed in accord with this preferred embodiment has completed over 100,000 switching operations without failure.

The automatic range switch can be operated in many variant embodiments. For instance, the output motor 2 and coils 4 and 6 can be replaced by other electromechanical driver means such as a bi-directional solenoid or a gear motor. The driver means can also be electronic (e.g., a ring circuit) or mechanical. Similarly, the selector means can be electronic rather than mechanical. The switching speed can be varied over a wide range by changing circuit values or motors. The circuit can be used with a wide range of input voltages by use of attenuators or amplifiers.

This versatility represents but one advantage of the range switching circuit, per se. Additional advantages are its small size and ruggedness, its automatic cycling to zero for ease of zero setting, its self contained power supply and the above-described stabilization controls including the multivibrator lock S–6 and the lock S–5 for relay K–3. The cost of the range switch components, including the motor, is about the same as that of the cheapest of the known prior art devices.

Advantages of the automatic range switch in combination with a vacuum system include the matching of switching speed to the speed of pressure changes encountered in vacuum systems and the cooperation with the conventional overpressure relay of the vacuum gauge control.

Since many variations can be made in the above described apparatus within the scope of the invention herein involved, it is intended that the description contained herein, and in the accompanying drawing, shall be regarded as illustrative and not in a limiting sense.

What is claimed is:

1. An automatic range switching control for monitoring an electrical signal input and comprising, in combination, a set of range defining resistances; a range selecting switch for selectively placing said resistances in circuit with input and output circuit connections, the output being an electrometer, or the like; a shaded pole electric motor for operating said range selecting switch; an electric power supply; a first relay for connecting said motor to said power supply; a unijunction multivibrator circuit having a square wave output for operating said first relay; a transistor switch for grounding the base of a unijunction transistor in said multivibrator circuit whenever said transistor switch is conducting; a voltage divider network electrically connected to the base of said switching transistor, to said input circuit connection and to a source of B voltage, the voltage divider network being arranged to inactivate said switching transistor when said input signal reaches a predetermined high signal limit; a switch operated by said first relay for grounding the base of the switching transistor; a transistorized, thermally compensated amplifier-switching circuit operating a second relay and being connected to said voltage divider network in such a manner that the second relay is operated whenever the input signal reaches a predetermined low signal limit; a third relay; said second relay operating said third relay and grounding the base of said switching transistor; said third relay reversing the direction of shading of the poles of said motor and locking itself in a position when operated; and a range limit switch operated by said motor for applying a cut-off signal to the base of said switching transistor when the range selecting switch reaches a first switch limit and for applying a cut-off signal to said amplifier when the range selecting switch reaches a second cut-off limit; a manually-operated switch for overriding the operation of said range limit switch at said first cut-off point to allow the range selecting switch to cycle to zero.

2. The control of claim 1 wherein the input signal is produced by an electrical vacuum gauge whose input current is proportional to a vacuum system pressure, the gauge being subject to failure if accidentally exposed to high pressure, the current being connected to the input signal source of said control via one of said range defining resistances, the control further comprising a switch operated by said motor for operating a means for cutting off operation of the gauge when the range selecting switch reaches a first switch limit point.

3. The combination of claim 2 wherein the control further comprises a control switch operated by said prime mover to control the vacuum process in response to movements of said range selecting switch.

4. An automatic range switching control for continuously monitoring an electrical signal input, comprising, in combination,
(a) selector means for selecting ranges of sensitivity;
(b) bi-directional driver means for operating said selector means;
(c) power supply means for operating said driver means when connected thereto and including direction control means;
(d) relay means for selectively connecting said driver means to said power supply means;
(e) timing means comprising an oscillating electrical pulse circuit, said timing means having a high speed pulsating output of uniform period, said timing means being operatively connected to said relay to cause the driver means to drive the selector means through a single range increment for each pulse of the oscillator when said oscillator is activated;
(f) electrical detector means operatively connected to said timing means continuously and to an electrical input signal source continuously to activate the pulse circuit of said timing means when the input signal is beyond predetermined upper and lower limits and to inactivate the pulse circuit of said timing means when the input signal is within predetermined limits, said detector means also being operatively connected to the direction control means of said drive means (b);
(g) an output signal device such as a meter, or the

---

[1] Fenwal QA5IJI.

like, connected to said signal input source via said selector means (a);

and wherein the said detector means (f) is linked to the timing means (e) and driver means (b) so that whenever the input signal is beyond an upper predetermined limit the selector means operates directly downwardly to bring the sensitivity to within predetermined limits and so that whenever the input signal is beyond a lower predetermined limit the selector means operates directly upwardly to bring the sensitivity to within predetermined limits;

whereby the range selector means (a) are cycled in the correct direction to find the proper range setting for the output signal device without preliminary cycling away from the correct range and without overshooting the correct range setting, and whereby the output signal device may be continuously coupled to the input signal during range switching operation.

5. The control of claim 4 wherein the pulse circuit of said timing means (e) is a unijunction multivibrator electrical circuit having a square wave voltage-time output.

6. The control of claim 4 further comprising (h) means for locking said relay means when the driver means is in operation whereby the said selector means can only be operated in complete range steps, without interruption, despite transients which may occur in the input or in the control itself.

7. The control of claim 4 wherein said driver means pole reversing switching means and a clutch and wherein (b) is a shaded pole, reversible, A.C. motor including said detector means (e) additionally comprises means for operating said pole reversing switching means when one of the predetermined limits of the input signal is exceeded.

8. The control of claim 4 in combination with an electrical vacuum gauge providing said electrical input signal.

9. The control of claim 4 wherein said detector means (f) further comprises means for selectively over-riding one of the predetermined limits to automatically cycle the control to zero.

10. The control of claim 4 with process controller means operated by said prime mover.

References Cited by the Examiner
UNITED STATES PATENTS

| 2,497,961 | 2/1950 | Shaw | 324—115 X |
| 2,735,062 | 2/1956 | Striker | 324—33 |
| 3,005,156 | 10/1961 | Hoberman | 324—115 |

WALTER L. CARLSON, *Primary Examiner.*

J. J. MULROONEY, *Assistant Examiner.*